(12) United States Patent
Lee et al.

(10) Patent No.: US 11,647,032 B2
(45) Date of Patent: May 9, 2023

(54) APPARATUS AND METHOD FOR CLASSIFYING ATTACK GROUPS

(71) Applicant: AGENCY FOR DEFENSE DEVELOPMENT, Daejeon (KR)

(72) Inventors: Hwaseong Lee, Daejeon (KR); Changhee Choi, Daejeon (KR); Ilhoon Jeong, Daejeon (KR); Hosang Yun, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 1171 days.

(21) Appl. No.: 16/180,855

(22) Filed: Nov. 5, 2018

(65) Prior Publication Data
US 2019/0370395 A1 Dec. 5, 2019

(30) Foreign Application Priority Data

May 29, 2018 (KR) .................. 10-2018-0061329

(51) Int. Cl.
*G06F 15/16* (2006.01)
*H04L 9/40* (2022.01)
*G06N 20/00* (2019.01)
*G06F 16/35* (2019.01)
*G06F 18/214* (2023.01)
*G06F 18/21* (2023.01)

(52) U.S. Cl.
CPC .......... *H04L 63/1425* (2013.01); *G06F 16/35* (2019.01); *G06F 18/214* (2023.01); *G06F 18/217* (2023.01); *G06N 20/00* (2019.01)

(58) Field of Classification Search
None
See application file for complete search history.

(56) References Cited

U.S. PATENT DOCUMENTS 6,460,049 B1 * 10/2002 Becker .................. G06F 16/355
707/999.102
8,370,942 B1 * 2/2013 Peterson ............... G06F 21/577
726/22
9,015,082 B1 4/2015 Jaiswal et al.
(Continued)

OTHER PUBLICATIONS

Bugra Cakir and Erdogan Dogdu. 2018. Malware classification using deep learning methods. In Proceedings of the ACMSE 2018 Conference (ACMSE '18). Association for Computing Machinery, New York, NY, USA, Article 10, 1-5. DOI:https://doi.org/10.1145/3190645.3190692.*

(Continued)

*Primary Examiner* — Mohamed A. Wasel
*Assistant Examiner* — Gregory P Tolchinsky
(74) *Attorney, Agent, or Firm* — Fenwick & West LLP

(57) ABSTRACT

The present disclosure relates to an attack group classifying apparatus. The apparatus includes a feature extracting unit configured to extract, from a data set including documents of specific formats, features for identifying attack groups using the documents of the specific formats and an information generating unit configured to generate a machine learning data set based on the extracted features. Further, the apparatus further includes a learning model unit configured to execute a machine learning algorithm on the machine learning data set to generate a classification model for identifying the attack groups.

15 Claims, 4 Drawing Sheets

(56) References Cited

U.S. PATENT DOCUMENTS

| | | | | |
|---|---|---|---|---|
| 2017/0083703 A1* | 3/2017 | Abbasi | ............... | G06F 21/561 |
| 2017/0193052 A1* | 7/2017 | Grehant | ............ | G06F 16/24564 |
| 2019/0007426 A1* | 1/2019 | Bergström | ............. | G06F 21/53 |
| 2019/0251251 A1* | 8/2019 | Carson | ................... | G06F 21/51 |
| 2021/0366048 A1* | 11/2021 | Westhues | ............... | G06Q 10/20 |

OTHER PUBLICATIONS

Hong, S-S. et al., "A Classification Model for Attach Mail Detection based on the Authorship Analysis," Journal of Internet Computing and Services, vol. 18, No. 6, Dec. 2017, pp. 35-46 (with English abstract).

* cited by examiner

APPARATUS AND METHOD FOR CLASSIFYING ATTACK GROUPS

CROSS-REFERENCE TO RELATED APPLICATIONS

This application claims priority to Korean Patent Application No. 10-2018-0061329, filed on May 29, 2018, the entire contents of which is incorporated herein by reference.

TECHNICAL FIELD

The present disclosure relates to an apparatus and a method for classifying attackers or attack groups in cyberspace and a learning algorithm for classifying the attackers and attack groups.

BACKGROUND

When cyberattacks occur, in order to trace or identify attackers or attack groups, it is required to collect information through forensic analysis for infringement response after the occurrence of the attacks and compare the collected information (e.g., malwares, logs and the like) with previously obtained information (e.g., IP addresses used by a specific group, cryptographic keys of malwares, coding pattern, similarity of attacks, and the like).

In the case of representative examples of advanced persistent threat (APT) attacks that occurred in South Korea such as 7.7 DDoS attacks, hacking attacks of NongHyup (NH) banking system, 320 cyber terror and the like, attackers were specified based on IP addresses, malware patterns, re-use of the same malware or the like. Therefore, the information that can specify attackers was identified based on the knowledge and experience of infringement analysts.

Particularly, as cyberattacks have become more sophisticated, studies using an attacker profiling technique instead of fragmentary information for specifying attackers/attack groups have been actively conducted domestically and internationally. However, it is difficult to analyze attack groups when the attack is beyond a certain rule, e.g., when custom malware used for an attack is discarded, when malware of different group is re-utilized, or when a false attack pattern is designed.

Therefore, it is required to additionally identify the information that is naturally generated without the attacker's (or producer's) intention when a cyberattack occurs, and also required to develop an analysis technique capable of specifying attack groups more flexibly.

Patent Document 1: Korean Patent Application Publication No. 2016-0095856 (Published on Aug. 12, 2016)

SUMMARY

The embodiments of the present disclosure suggest a technique capable of rapidly and accurately classifying attack groups in cyberspace.

Specifically, the embodiments of the present disclosure provide a technique capable of additionally identifying unintentional attack groups and efficiently classifying the attack groups of a document of a specific format by extracting features for identifying attack groups from a data set including the document of the specific format used in cyberattacks and applying a classification learning algorithm to the extracted features.

It is to be understood, however, that the object of the present disclosure is not limited to those mentioned above.

Other objects not mentioned above will be clearly understood by those skilled in the art from the following description.

In accordance with an aspect of the present disclosure, there is provided an attack group classifying apparatus including: a feature extracting unit configured to extract, from a data set including documents of specific formats, features for identifying attack groups using the documents of the specific formats; an information generating unit configured to generate a machine learning data set based on the extracted features; and a learning model unit configured to execute a machine learning algorithm on the machine learning data set to generate a classification model for identifying the attack groups.

Further, the specific formats of the documents may include at least one of an e-mail file format, a document file format and an executable file format.

Further, the features may include at least one of location information, language information, time information, system information, file attribute information and n-gram information.

Further, the information generating unit may generate the machine learning data set by pre-processing for classifying the features into categorical features and numerical features.

Further, the learning model unit may execute the machine learning algorithm after the machine learning data set is classified into a training data set and a test data set.

Further, when the machine learning algorithm is executed, a K-fold cross validation algorithm for generating the classification model may be executed after the machine learning data set is classified into a K-number of sub data sets.

Further, each of the sub data sets may include the training data set and the test data set at a ratio of K-1:1.

Further, the apparatus described above may further include an attack group classifying unit configured to apply the classification model to an arbitrary document of a specific format to classify attack groups of the arbitrary document of the specific format.

In accordance with another aspect of the present disclosure, there is provided a learning method for classifying attack groups including: collecting a data set including documents of specific formats; extracting features for identifying attack groups using the documents of the specific formats from the data set; generating a machine learning data set based on the extracted features; and generating a classification model for identifying the attack groups by executing a machine learning algorithm on the machine learning data set.

Further, the specific formats of the documents may include at least one of an e-mail file format, a document file format, and an executable file format.

Further, the features may include at least one of location information, time information, language information, system information, file attribute information and n-gram information.

Further, in the generating the machine learning data set, the machine learning data set may be generated by pre-processing for classifying the features into categorical features and numerical features.

Further, in the generating the classification model, the machine learning algorithm may be executed after the machine learning data set is classified into a training data set and a test data set.

Further, in the executing the machine learning algorithm, a K-fold cross validation algorithm for generating the classification model may be executed after the machine learning data set is classified into a K-number of sub data sets.

Further, each of the sub data sets may include the training data set and the test data set at a ratio of K-1:1.

In accordance with still another aspect of the present disclosure, there is provided an attack group classifying method including: collecting a data set including documents of specific formats; extracting features for identifying attack groups using the documents of the specific formats from the data set; generating a machine learning data set based on the extracted features; generating a classification model for identifying the attack groups by executing a machine learning algorithm on the machine learning data set; and classifying attack groups of an arbitrary document of a specific format by applying the classification model to the arbitrary document of the specific format.

According to aspects of the present disclosure, it is possible to obtain additional trace information that is not conventionally known and identify attack groups more accurately by utilizing the additional information.

Further, it is possible to secure a cyberattack core technology capable of quickly dealing with the attack by rapidly identifying attack groups and responding to a rapid network centric warfare (NCW) paradigm by quickly identifying attack groups.

Further, it is possible to ensure the safe operation of a defense information system against cyber threats, develop a specialized defense technique for preventing repeat attacks by quickly identifying attack groups, and contribute to the development of private information protection technology.

BRIEF DESCRIPTION OF THE DRAWINGS

The objects and features of the present disclosure will become apparent from the following description of embodiments, given in conjunction with the accompanying drawings, in which.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that the detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Generally, in current cyberattacks, attack groups inject malware into a target host through various routes (e.g., e-mail, external storage mediums, websites, and the like) to execute the malware. For example, a document malware attack through e-mail is one of the most common types of cyberattacks among hackers. Therefore, it is required to extract meaningful information, through which attackers or attack groups can be specified, from the information generated at the host level. That is to say, each formal (e-mail format, document file format, executable file format, or the like) may include attacker's information generated unintentionally therein and, thus, there is a necessity to have a specialized analysis for identifying attack groups from each of these formats.

In the embodiments of the present disclosure, there is provided a technique in which features for identifying the attack groups are extracted from a data set including documents of specific formats used in cyberattacks and a classification learning algorithm is applied to the extracted features to rapidly and accurately identify attack groups that do not intend to be identified in cyberspace and efficiently classify the attack groups from the documents of the specific formats.

The features and the classification learning described in the embodiments of the present disclosure can be defined as follows:

1) Features: indicates information that can be utilized to directly or indirectly identify and specify attackers or attack groups, and corresponds to trace information at the time of analysis of the classification learning.

2) Classification learning: includes machine learning except for conventional rule-based learning.

Hereinafter, embodiments of the present disclosure will be described in detail with reference to the accompanying drawings.

Figure 1:
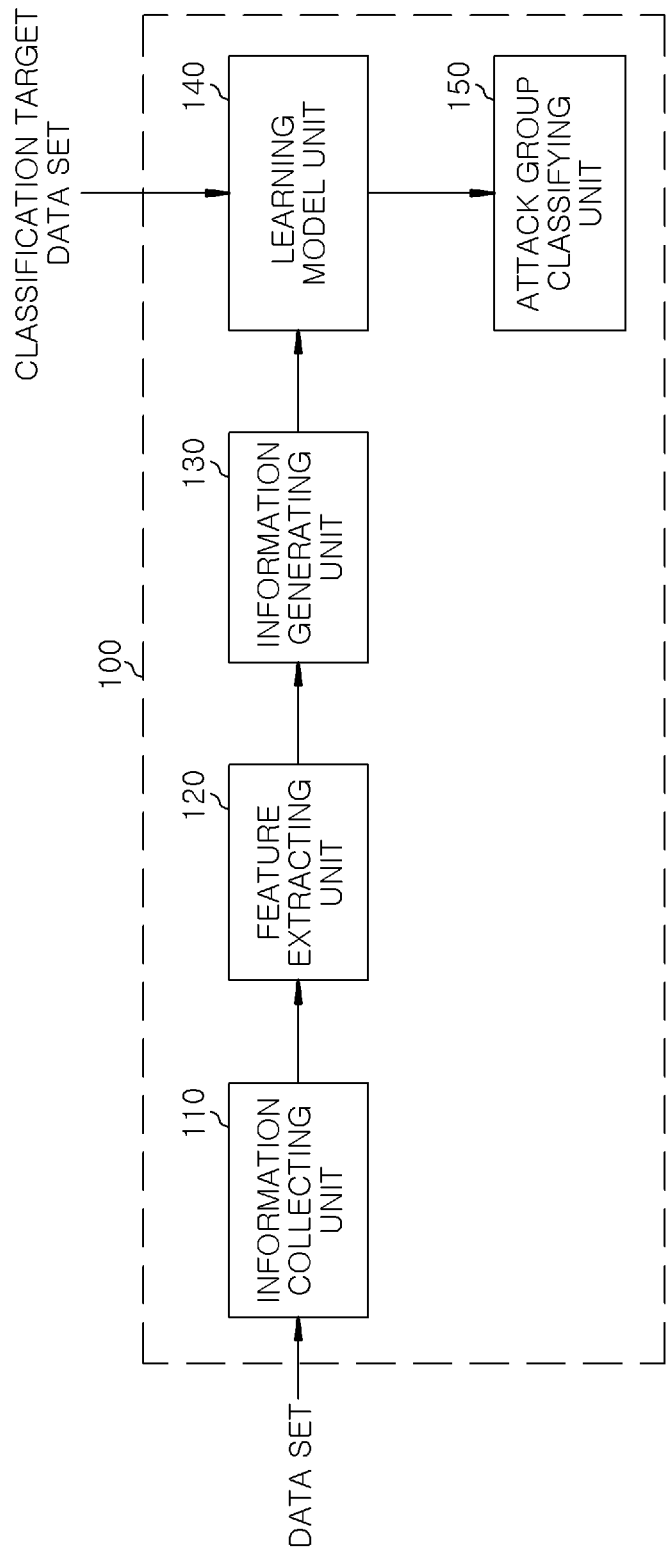
FIG. 1 is a block diagram of an apparatus for classifying attack groups according to one embodiment of the present disclosure.

FIG. 1 is a block diagram of an attack group classifying apparatus according to one embodiment of the present disclosure.

An attack group classifying apparatus 100 shown in FIG. 1 may include an information collecting unit 110, a feature extracting unit 120, an information generating unit 130, and a learning model unit 140. The attack group classifying apparatus 100 may further include an attack group classifying unit 150, if necessary.

As shown in FIG. 1, the information collecting unit 110 is configured to collect a data set including documents of specific formats, e.g., an e-mail, a document file, an executable file and the like, that is used in actual attacks. The data set may contain labels of attack countries. The following table 1 shows examples of collection targets and collection ranges of the data set.

TABLE 1

| Classification | Description | Example |
| --- | --- | --- |
| Collection target | E-mail | |
| | Document file | PDF, MS-Office, HWP, or the like |
| | Executable file | PE (Portable Executable) file |
| Collection range | information that can directly specify attackers | Attack group information, system information, or the like |
| | information that can indirectly specify attackers | Document file format information, n-gram, or the like |

In the case of document malware, the malware exploited in the document can be analyzed through PE file format. The document file format can also be analyzed to extract trace information that may have remained unintentionally by the attacker. The document file format may be classified into compound document file format (CDFF), office open XML (OOXML), portable document format (PDF) and the like depending on the file extension. For the sake of convenience, they are collectively referred to as "DOC". Therefore, e-mails, DOC files, PE files and the like may be examples of collection targets.

The feature extracting unit 120 is configured to extract features (trace information) for identifying attack groups using the documents of the specific formats from the data set including the documents of the specific formats collected by the information collecting unit 110. These features may include, e.g., at least one of location information, language information, time information, system information, file attribute information and n-gram information, which will be described in detail later.

The information generating unit 130 is configured to generate a machine learning data set based on the features extracted by the feature extracting unit 120. Here, the information generating unit 130 generates the machine learning data set after pre-processing for classifying the features into categorical features and numerical features.

The learning model unit 140 is configured to generate a classification model for identifying the attack groups using the documents of the specific formats by executing a machine learning algorithm on the machine learning data set generated by the information generating unit 130. Here, the learning model unit 140 executes the machine learning algorithm after the machine learning data set is classified into a training data set and a test data set. The machine learning algorithm will be described in detail later.

The attack group classifying apparatus 100 according to the embodiment of the present disclosure may further include the attack group classifying unit 150, which is configured to classify attack groups of arbitrary documents. The arbitrary documents indicate, e.g., classification target data for classification of attack groups, and may be documents of specific formats including at least one of an e-mail format, a document file format and an executable file format.

Hereinafter, the learning method of the attack group classifying apparatus 100 according to the embodiment of the present disclosure will be described in detail with the above-described configurations.

Figure 2:
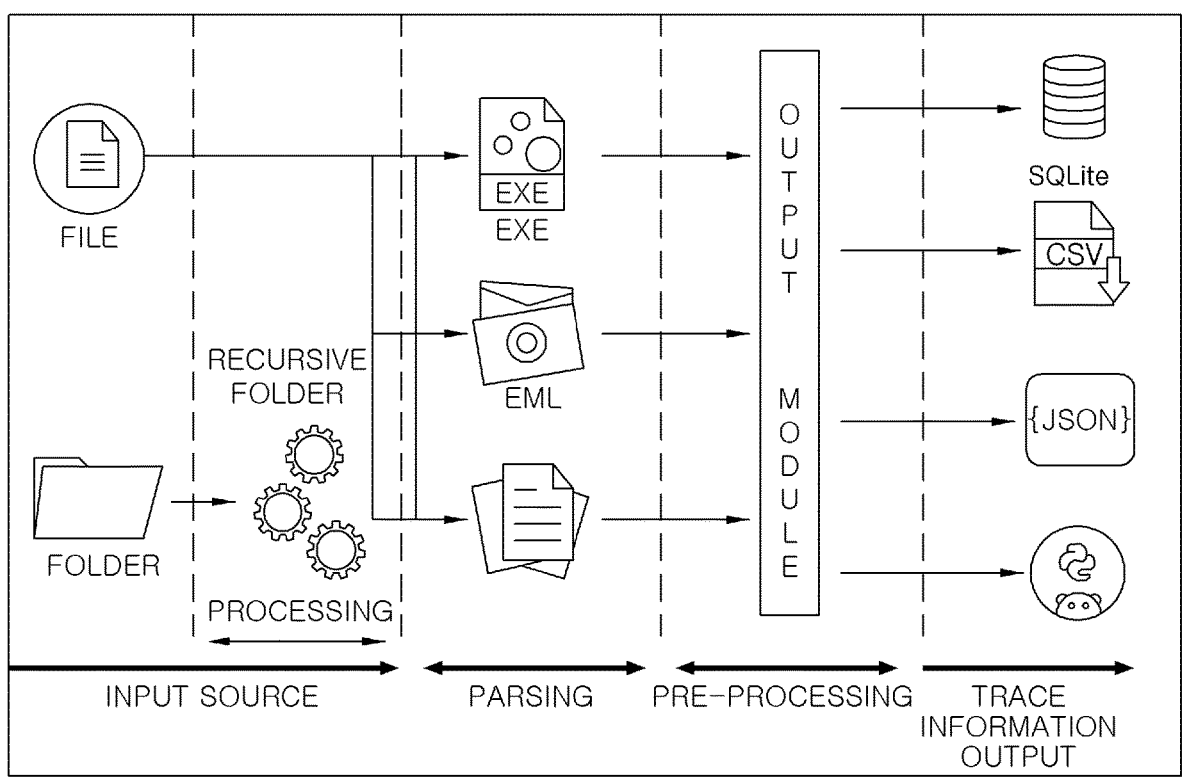
FIG. 2 shows an example of a parsing process of a parser according to one embodiment of the present disclosure.
Figure 4:
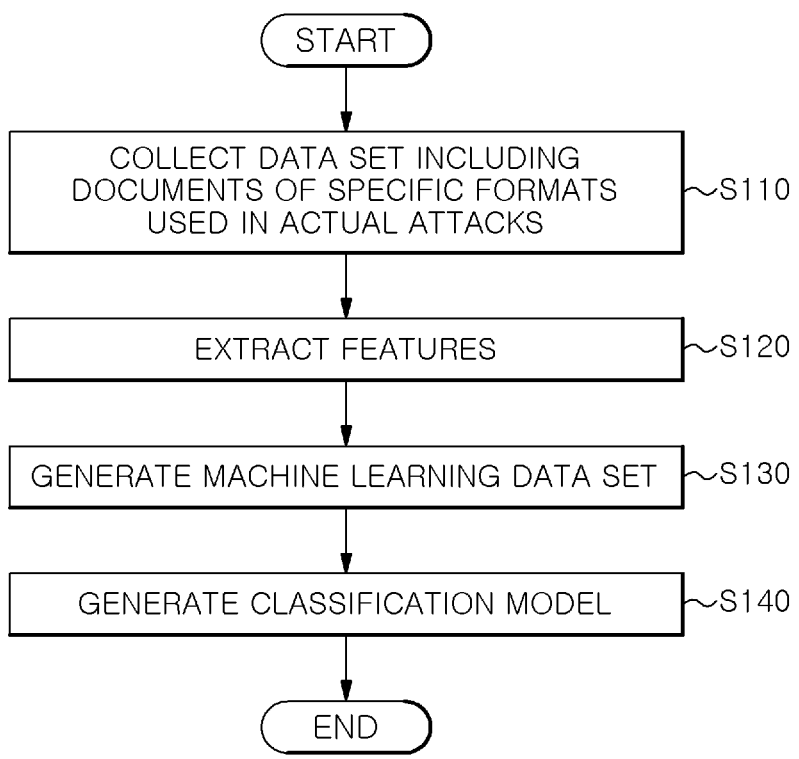
FIG. 4 is a flowchart explaining the example of the learning method for classifying attacking groups according to one embodiment of the present disclosure.

FIG. 2 shows an example of a parsing process of a parser according to one embodiment of the present disclosure is a parsing process of a parser and FIG. 4 is a flowchart explaining an example of a learning method for classifying attack groups according to one embodiment of the present disclosure.

As shown in FIGS. 2 and 4, the information collecting unit 110 collects a data set including documents of specific formats used in actual attacks (S110).

The above data set collecting step of S110 is a process of acquiring reliable information for machine learning. In the embodiment of the present disclosure, the data set can be collected from, e.g., a plurality of advanced persistent threat (APT) reports. The malwares can be collected by listing the hash values of the malwares described in each of the APT reports and downloading, from a malware download site (such as VirusShare or the like), the malwares that match the hash values of the malwares described in the APT reports. When the malware collection is completed, the attack groups can be classified based on the attack countries listed in each of the APT reports. In other words, the labels (or classes) of the data set are the attack countries that are the attack groups of the malwares. In this manner, 310 APT reports published between 2009 and 2016 were collected. After removing duplicate files, a data set including 5707 files (e.g., e-mails, DOC files, PE files and the like) classified into 10 attack groups (countries) was generated.

When the data set is collected by the information collecting unit 110, the feature extracting unit 120 extracts features, e.g., trace information, for identifying attack groups using documents of specific formats from the collected data set (S120).

The trace information can be identified by analyzing the attacker/attack group information (e.g., country information and system information used at the time of generating malware) in the formats of the analysis targets (e.g., e-mails, DOC files, PE files and the like) defined as described above. The trace information may include language information, location information, time information, system information, and other information, and can be classified into features for profile analysis (hereinafter referred to as "profile-oriented features") and features for machine learning analysis (hereinafter referred to as "ML-oriented features").

<Profile-oriented features>
1) Time-based features and location-based features Time information is commonly included in all formats of, e.g., e-mails. DOC files, PE files and the like. The time information can be basically expressed by universal time coordinated (UTC) information. In case of e-mails and DOC files, the location can also be identified by using "IP2Location" service since UTC and time zone information are included in some fields of e-mails and DOC files. In other words, in the case of PE files, only the UTC time at which an executable file was built can be identified. However, in the case of e-mails and DOC files, it is possible to extract the time information and identify region/location information (e.g., country, latitude, longitude, time zone (IP), ISP, domain, and the like).

2) Language-based features

Language information is commonly included in all formats of e-mails, DOC files, PE files and the like. In the case of e-mails, the language information can be extracted from, e.g., the "Received" field, the "Date" field, the "IP" field and the like. In the case of DOC files, it is possible to identify the application (APP) installation language, the operating system (OS) version language, the producer profile language, a change in the font in a document or the like. In the case of PE files, it is possible to identify the language by the folder name used in the program database (PDB) path or extract character set (charset) information for each resource type (e.g., string, icon, menu, or the like) used in a resource area.

3) System-based features

System information may be included in different forms in all formats of, e.g., e-mails, DOC files, PE files and the like. In the case of e-mails, a "User-Agent" field includes the type and version of the OS, the client program, and the like. In the case of DOC files, it is possible to extract attacker system information (OS type/version/language version), attacker APP information (document/development tool APP version), attacker account information (OS/APP/development environment account information), other c2 server URLs, and the like. In the case of PE files, the NT HEADER format includes a linker, the OS type, and the like.

4) Type-specific features

In e-mails, DOC files and PE files, information can be extracted depending on specific file attributes. For example, in the case of e-mails, it is possible to infer an attack country by substituting business hours based on time information. According to a plurality of recent analysis reports, when the time information converted into weekdays/weekends and business hours/non-business hours was compared and analyzed, it was found that the activities were conducted during hours that were very similar to the business hours of the actual attack site. Among the DOC files, PDF files have a unique identifier for the document and, thus, this identifier can be used as trace information. In the case of PE files, the entry point, packer information and anti virtual machine (VM) information can be extracted and utilized as trace information specific to PE files.

<ML-oriented features>

N-grams, which are useful features for machine learning analysis, can also be extracted. N-grams can be extracted in all formats, e.g., e-mails, DOC files, PE files. In the case of e-mails, 1-gram is extracted from mail contents. In the case of DOC files, 1-gram is extracted from the contents displayed when opening an actual document. In the case of PE files, 1-gram can be extracted from each section. Further, in the case of PE files, the frequency of highly used operation code (opcode) sets can also be extracted as trace information (features).

In the feature extracting step of S120 described above, the trace information for each format can be extracted by, e.g., a parsing process of a parser, as shown in FIG. 2. The data set is divided into 10 folders (10 countries), and the parser recursively parses the file for each format. At this time, the highest folder name, i.e., the country name, can be extracted and stored in the label (or class) column. The label (or class) column corresponds to the label (or class) in the classification analysis. In the case of the parser of FIG. 2, the trace information output is stored as a ".db file" by default. For convenience of analysis, the output of the trace information can be stored as a data frame format such as CSV, JSON, pandas and the like.

When the features are extracted in step S120, the information generating unit 130 generates a machine learning data set (S130). The machine learning data generating step in S130 may include a step of extracting features such as trace information and a step of selecting specific trace information by pre-processing for classifying the features as numerical features and categorical features to eventually generate the machine learning data.

In the pre-processing stage, all trace information extracted for each format are classified into numerical information and categorical information. The trace information classified into numerical information is used as features after the range thereof is determined. The trace information classified into categorical information is converted by one-hot encoding. For example, for dll_characteristics of PE files, the number of outcomes that can be expressed by predefined values is limited). In this case, it is converted by one-hot encoding to be used as trace information for machine learning.

Thereafter, the step of selecting specific trace information from the entire set of trace information is performed. This specific trace information selection can be performed by, e.g., sequential forward selection (SFS), sequential backward selection (SBS), or the like. In the former case, starting from no trace information (features), trace information is selected while sequentially adding the trace information until the misclassification rate of the trace information no longer decreases. In the latter case, trace information is selected while sequentially removing the trace information from the entire trace information until the misclassification rate no longer increases.

The machine learning data set for each format for classifying attackers/attack groups can be generated through the above steps.

When the machine learning data set is generated by the information generating unit 130, the learning model unit 140 executes a machine learning algorithm on the machine learning data set to generate a classification model for identifying attack groups (S140).

The classification model generating step of S140 according to the embodiment of the present disclosure may include a step of classifying the machine learning data set into a training data set and a test data set, and then executing the machine learning algorithm. The learning algorithm executing step in S140 may include a step for classifying the machine learning data set into a K-number of sub data sets and then executing a K-fold cross validation algorithm for generating the classification model.

Figure 3:
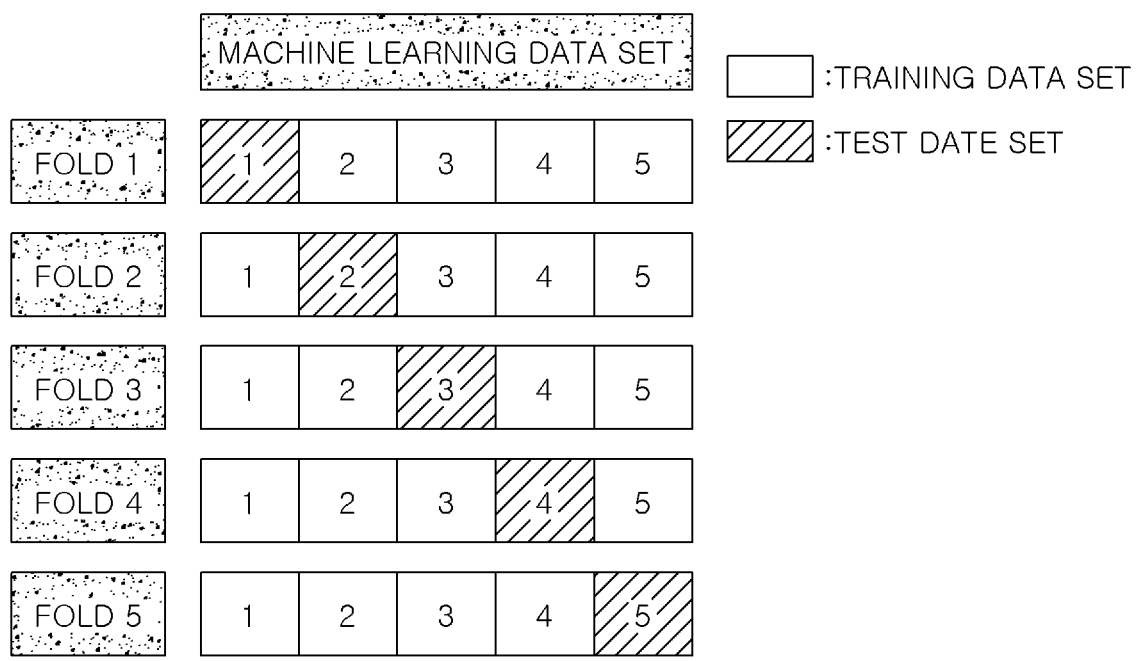
FIG. 3 is an example of K-fold cross validation algorithm according to one embodiment of the present disclosure.

FIG. 3 is an example of the K-fold cross validation algorithm according to one embodiment of the present disclosure.

In the example shown in FIG. 3, the machine learning data set is divided into five sub data sets (that is, K is equal to 5). In each fold (each of folds 1 to 5), the training data set and the test data set are divided at a ratio of K-1:1, i.e., 4:1. The accuracy for each machine learning algorithm can be calculated by applying a series of machine learning algorithms to each fold. The machine learning algorithm with the highest accuracy can be used as an intelligent analysis model for classification.

In the embodiment of the present disclosure, it is possible to collect data sets for each format by 5-fold cross validation analysis and perform analysis for each format. This is because it is difficult to collect a set of document malwares and e-mail actually used in a specific attack when a cyberattack occurs.

In the case of inputting an arbitrary document of a specific format, e.g., an attack group classification target data set for a new cyberattack, into the learning model unit 140 after the classification model for classifying attack groups according to the embodiment of the present disclosure is generated, a step of classifying attack groups of the arbitrary document of the specific format by applying the generated classification model may be further performed.

As described above, in accordance with the embodiments of the present disclosure, it is possible to rapidly and accurately identify attack groups in cyberspace and efficiently classify the attack groups of the documents of specific formats by extracting features from a data set that includes the documents of the specific formats used in the cyberattack and applying a classification learning algorithm to the extracted features.

The combinations of respective sequences of a flow diagram attached herein may be carried out by computer program instructions. Since the computer program instructions may be executed by the processors of a general purpose computer, a special purpose computer, or other programmable data processing apparatus, the instructions, executed by the processor of the computer or other programmable data processing apparatus, create means for performing functions described in the respective sequences of the sequence diagram.

The computer program instructions, in order to implement functions in a specific manner, may be stored in a computer-useable storage medium or a computer-readable storage medium (or a memory) for a computer or other programmable data processing apparatus, and the instructions stored in the computer-useable storage medium or the computer-readable storage medium (or the memory) may produce manufacturing items including an instruction means for performing functions described in the respective sequences of the sequence diagram.

Further, the computer program instructions may be loaded in a computer or other programmable data processing apparatus, and therefore, the instructions, which are a series of sequences executed in a computer or other programmable data processing apparatus to create processes executed by a computer to operate a computer or other programmable data processing apparatus, may provide operations for executing functions described in the respective sequences of the flow diagram.

Moreover, the respective sequences may refer to two or more modules, segments, or codes including at least one executable instruction for executing a specific logical function(s). In some alternative embodiments, it is noted that the functions described in the sequences may be run out of order. For example, two consecutive sequences may be substantially executed simultaneously or often in reverse order according to the corresponding functions.

What is claimed is:

1. An attack group classifying apparatus comprising:
    a processor; and
    a non-transitory storage medium storing instructions thereon, the instructions when executed by the processor cause the processor to:
    extract, from a data set including documents of specific formats, features for identifying attack groups using the documents of the specific formats, each of the attack groups representing a country or an entity that injects malware in the documents;
    generate a machine learning data set based on the extracted features; and
    run a machine learning algorithm on the machine learning data set to train a classification model for identifying the attack groups based on the extracted features, so that the classification model determines whether an arbitrary documents of the specific formats is received from the attack groups without using a rule-based algorithm,
    wherein when the machine learning algorithm is executed, a K-fold cross validation algorithm for generating the classification model is executed after the machine learning data set is classified into a K-number of sub data sets,
    wherein each of the sub data sets includes training data set and test data set at a ratio of K-1:1, and
    wherein each of the attack groups represents a country.

2. The apparatus of claim 1, wherein the specific formats of the documents include at least one of an e-mail file format, a document file format and an executable file format.

3. The apparatus of claim 1, wherein the extracted features include at least one of location information, language information, time information, system information, file attribute information and n-gram information.

4. The apparatus of claim 1, wherein the instructions when executed by the processor cause the processor to generate the machine learning data set by pre-processing the features into categorical features and numerical features, for classification.

5. The apparatus of claim 4, wherein instruction for executing the machine learning algorithm comprises instructions to execute the machine learning algorithm after the machine learning data set is classified into the training data set and the test data set.

6. The apparatus of claim 1, wherein the instructions further cause the processor to apply the classification model to an arbitrary document of a specific format to classify attack groups of the arbitrary document of the specific format.

7. The apparatus of claim 1, wherein the instructions further cause the processor to collect the data set by:
    receiving advanced persistent threat (APT) reports,
    obtaining hash values of malwares in the APT report; and
    obtaining the malwares that matches the hash values.

8. The apparatus of claim 1, wherein the instructions further cause the processor to classify malware into each of the attack groups.

9. A learning method for classifying attack groups comprising:
    collecting a data set including documents of specific formats;
    extracting features for identifying attack groups using the documents of the specific formats from the data set, each of the attack groups representing a country or an entity that injects malware in the documents;
    generating a machine learning data set based on the extracted features; and
    training a classification model for identifying the attack groups by executing a machine learning algorithm on the machine learning data set based on the extracted features, so that the classification model determines whether an arbitrary documents of the specific formats is received from the attack groups without using a rule-based algorithm,
    wherein when the machine learning algorithm is executed, a K-fold cross validation algorithm for generating the classification model is executed after the machine learning data set is classified into a K-number of sub data sets,
    wherein each of the sub data sets includes training data set and test data set at a ratio of K-1:1, and
    wherein each of the attack groups represents a country.

10. The method of claim 9, wherein the specific formats of the documents include at least one of an e-mail file format, a document file format, and an executable the format.

11. The method of claim 9, wherein the extracted features include at least one of location information, language information, time information, system information, file attribute information and n-gram information.

12. The method of claim 9, wherein, in said generating the machine learning data set, the machine learning data set is generated by pre-processing for classifying the features into categorical features and numerical features.

13. The method of claim 9, wherein, in said generating the classification model, the machine learning algorithm is executed after the machine learning data set is classified into the training data set and the test data set.

14. An attack group classifying method comprising:
    collecting a data set including documents of specific formats;
    extracting features for identifying attack groups using the documents of the specific formats from the data set, each of the attack groups representing a country or an entity that injects malware in the documents;
    generating a machine learning data set based on the extracted features;
    training a classification model for identifying the attack groups based on the extracted features;
    inputting an arbitrary document of a specific format to the classification model;

determining, by the classification model, whether an arbitrary documents of the specific formats is received from the attack groups without using a rule-based algorithm, wherein the extracted features include location information, language information, and n-gram information, wherein when the machine learning algorithm is executed, a K-fold cross validation algorithm for generating the classification model is executed after the machine learning data set is classified into a K-number of sub data sets, wherein each of the sub data sets includes training data set and test data set at a ratio of K-1:1, and wherein each of the attack groups represents a country.

15. A non-transitory computer-readable storage medium including computer-executable instructions, which cause, when executed by a processor, the processor to perform a learning method for classifying attack groups, the method comprising:

collecting a data set including documents of specific formats;

extracting features for identifying attack groups using the documents of the specific formats from the data set, each of the attack groups representing a country or an entity that injects malware in the documents;

generating a machine learning data set based on the extracted features;

training a classification model for identifying the attack groups based on the extracted features;

inputting an arbitrary document of a specific format to the classification model, determining, by the classification model, whether an arbitrary documents of the specific formats is received from the attack groups without using a rule-based algorithm, wherein the extracted features include location information, language information, and n-gram information, wherein when the machine learning algorithm is executed, a K-fold cross validation algorithm for generating the classification model is executed after the machine learning data set is classified into a K-number of sub data sets, wherein each of the sub data sets includes training data set and test data set at a ratio of K-1:1, and wherein each of the attack groups represents a country.

* * * * *